Dec. 13, 1966  D. R. GRODY  3,290,976
PAPER CUTTING MACHINE
Original Filed Jan. 5, 1962  7 Sheets-Sheet 2
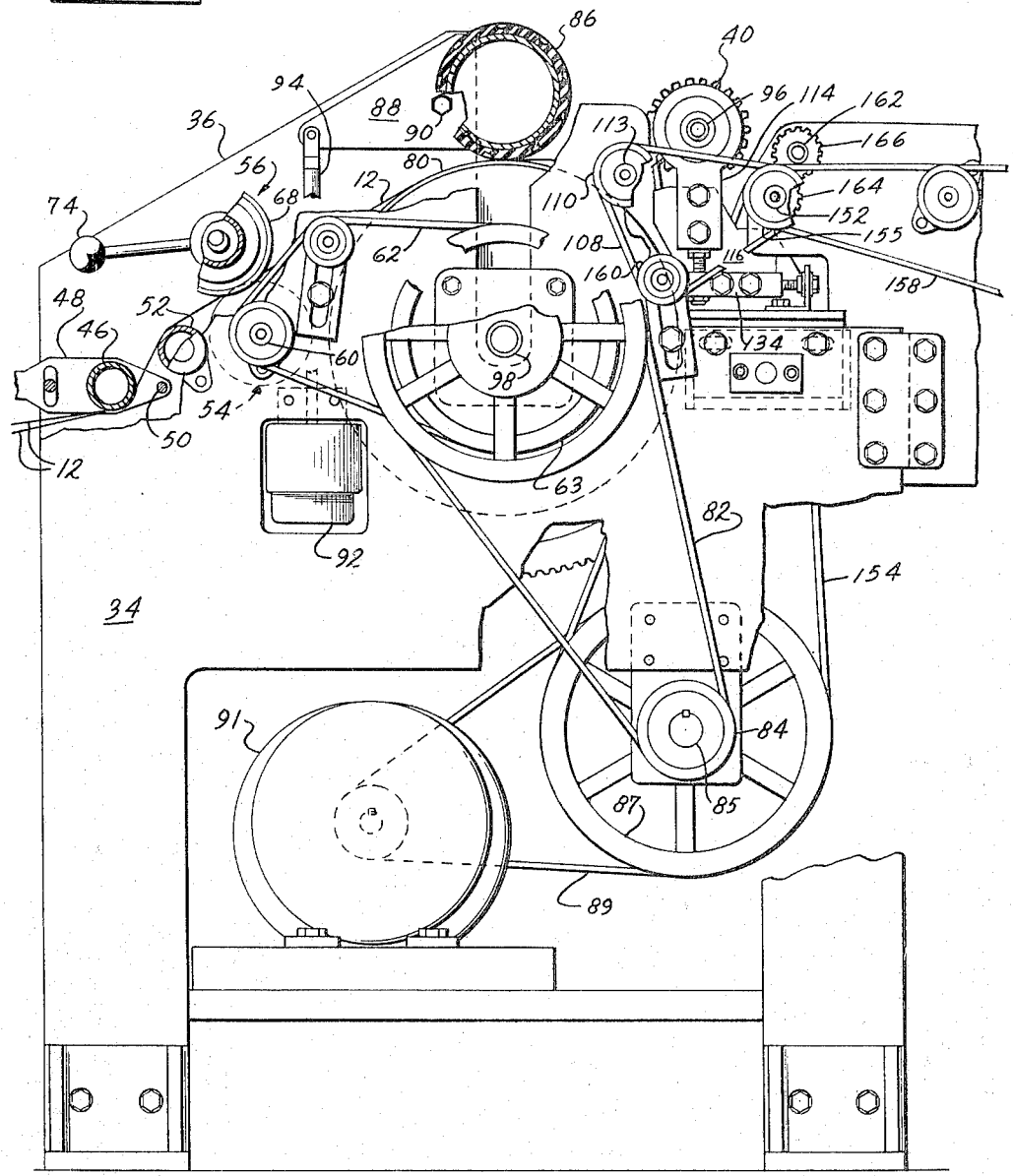
INVENTOR.
Donald R. Grody
BY Chapin & Neal
Attorneys

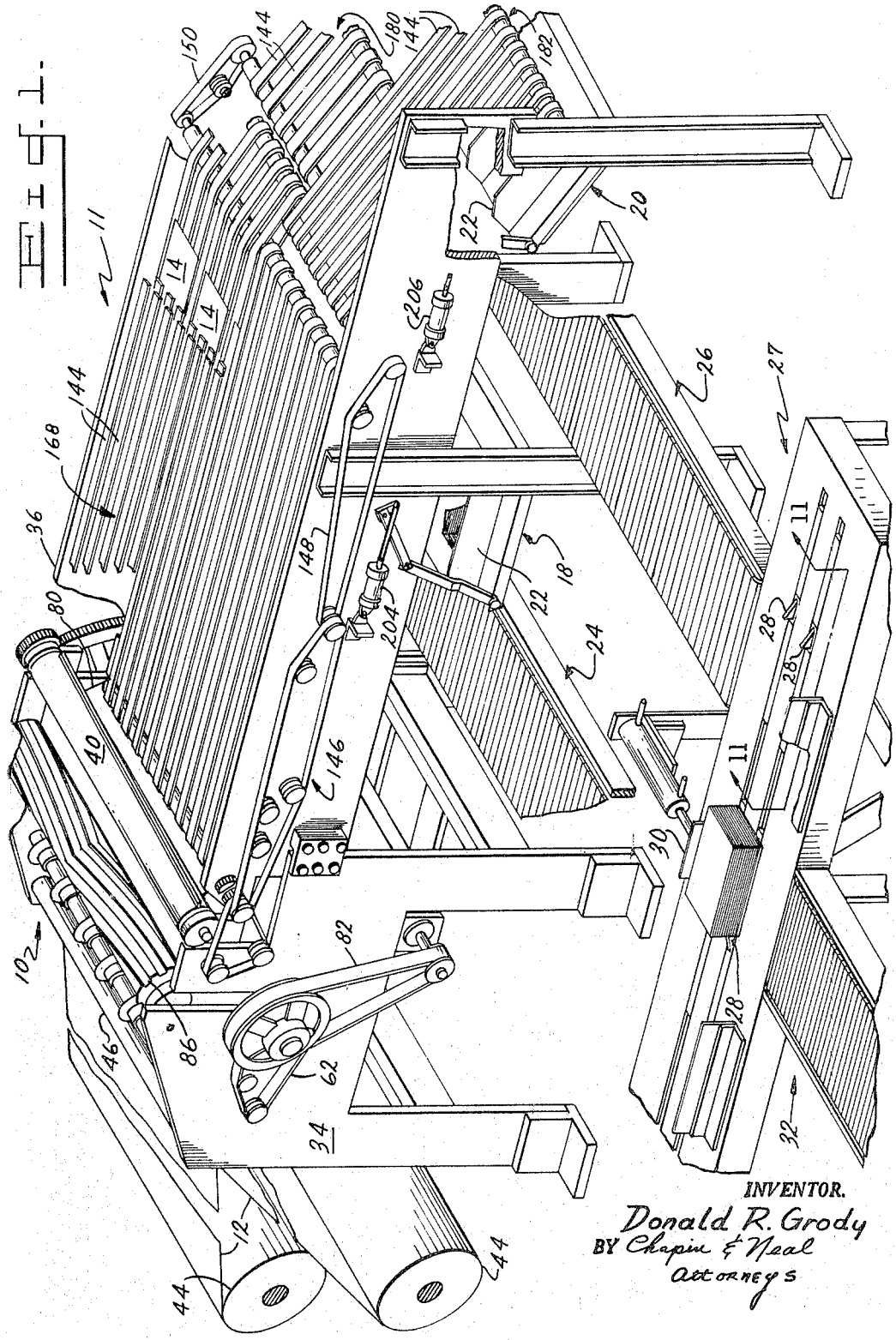

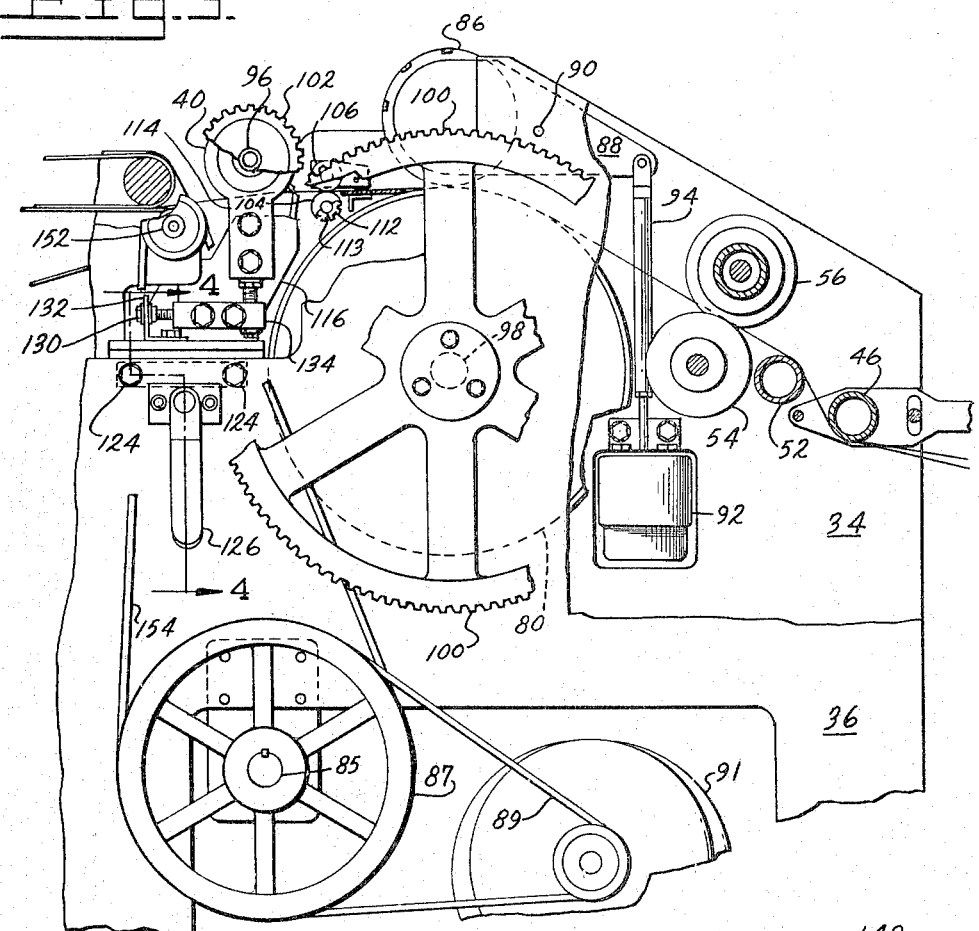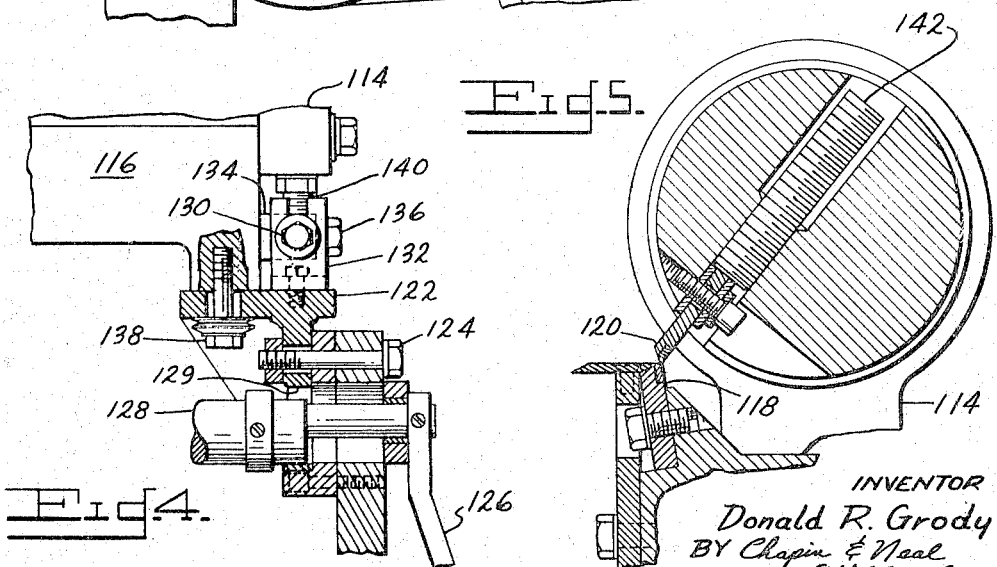

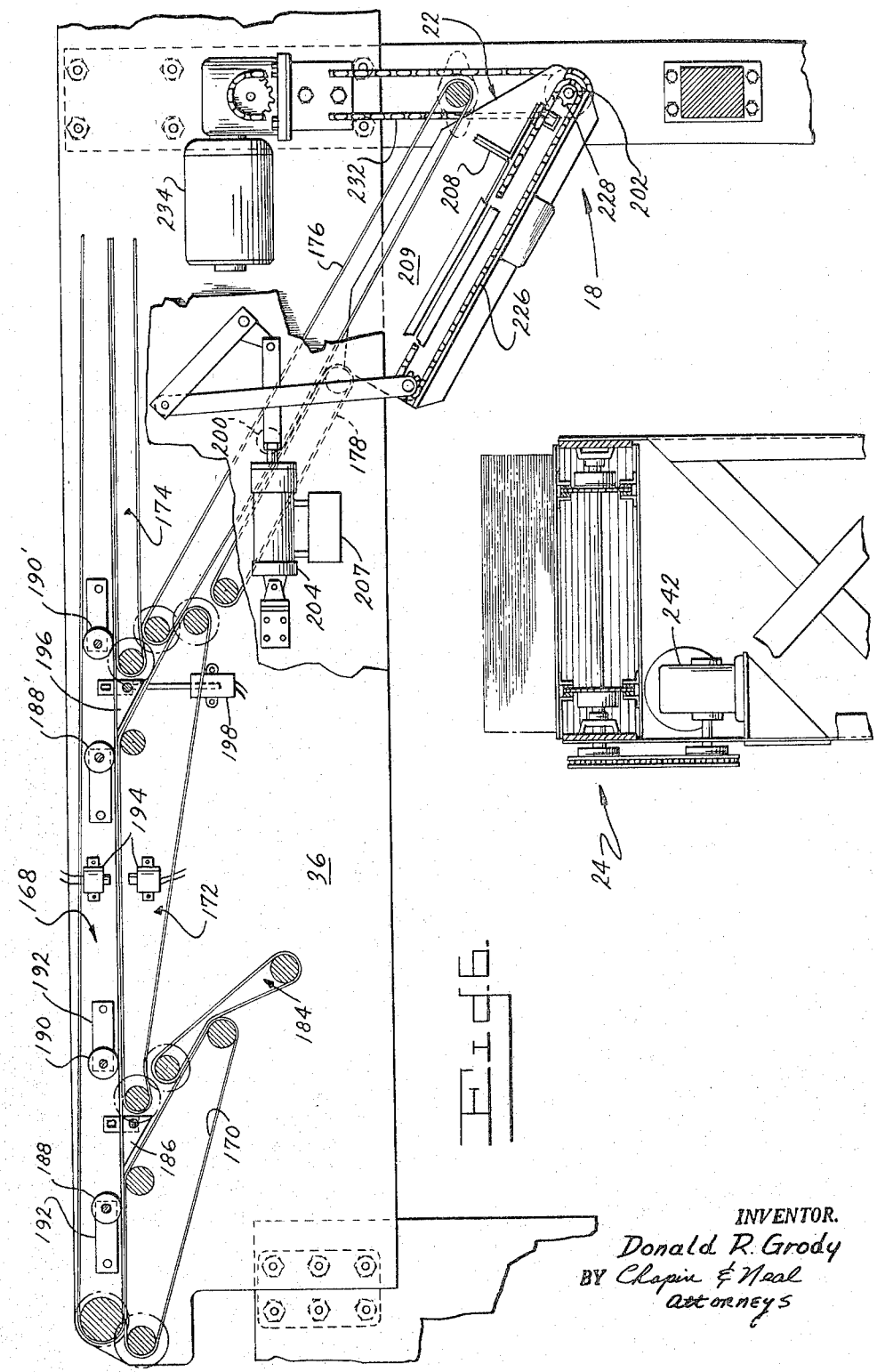

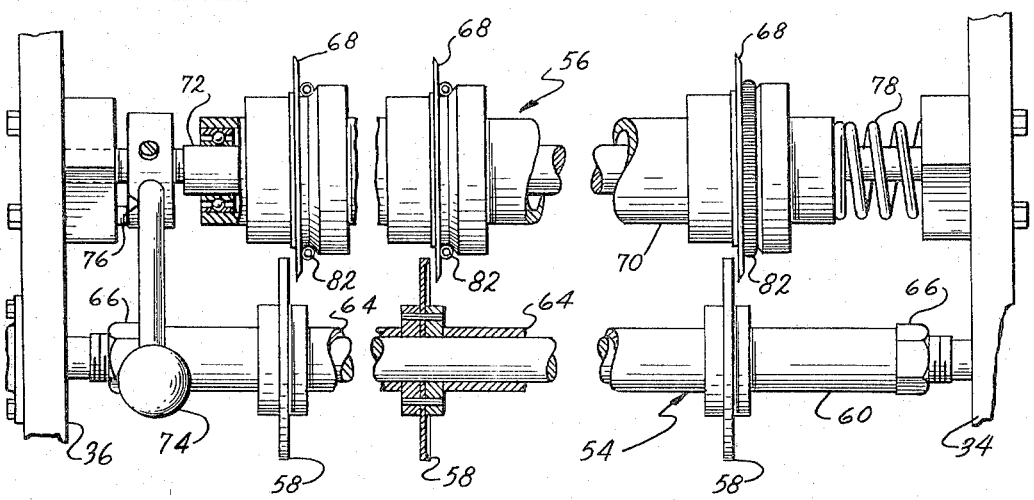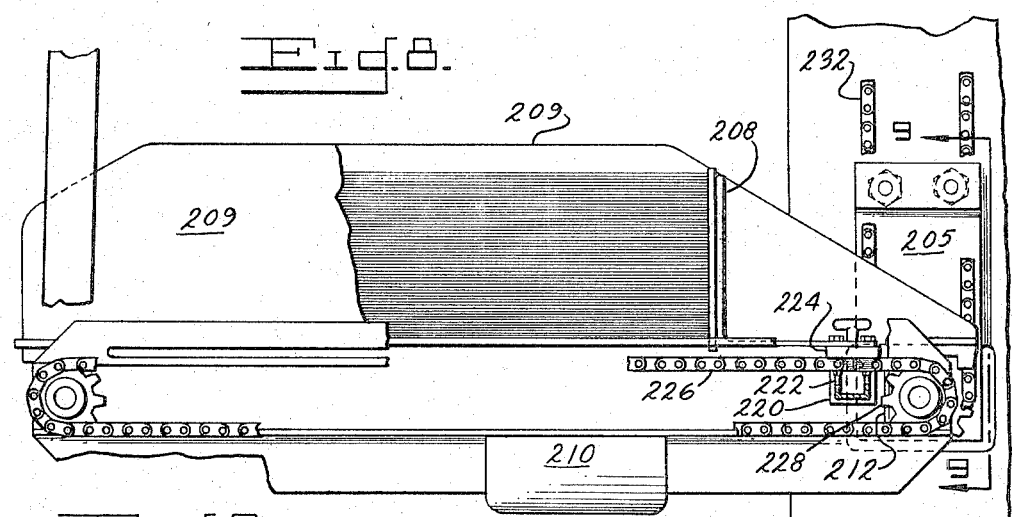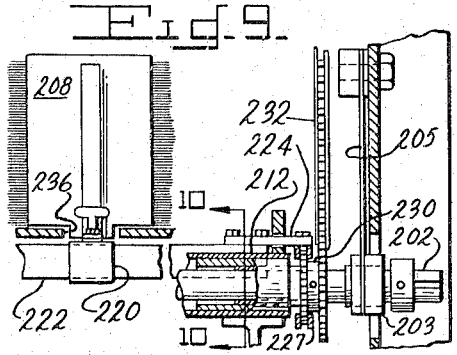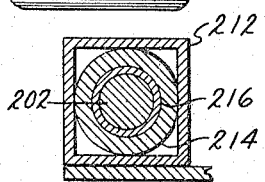

Dec. 13, 1966 D. R. GRODY 3,290,976
PAPER CUTTING MACHINE
Original Filed Jan. 5, 1962 7 Sheets-Sheet 6
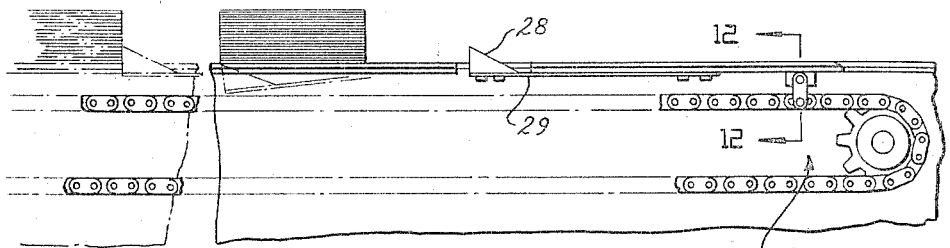
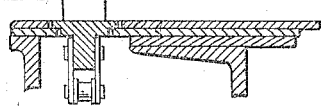
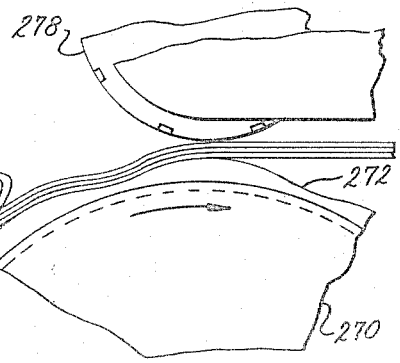
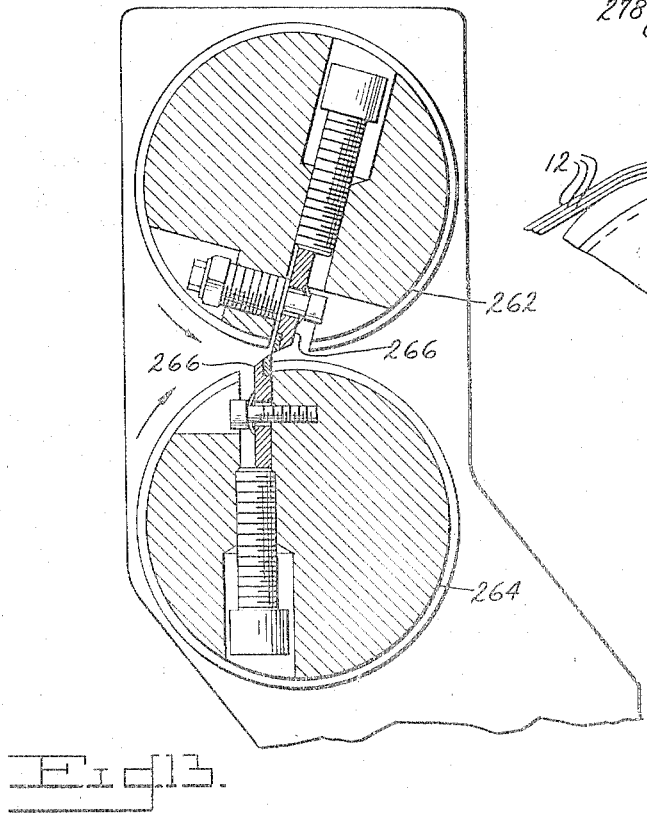
INVENTOR.
Donald R. Grody
BY Chipin & Neal
Attorneys

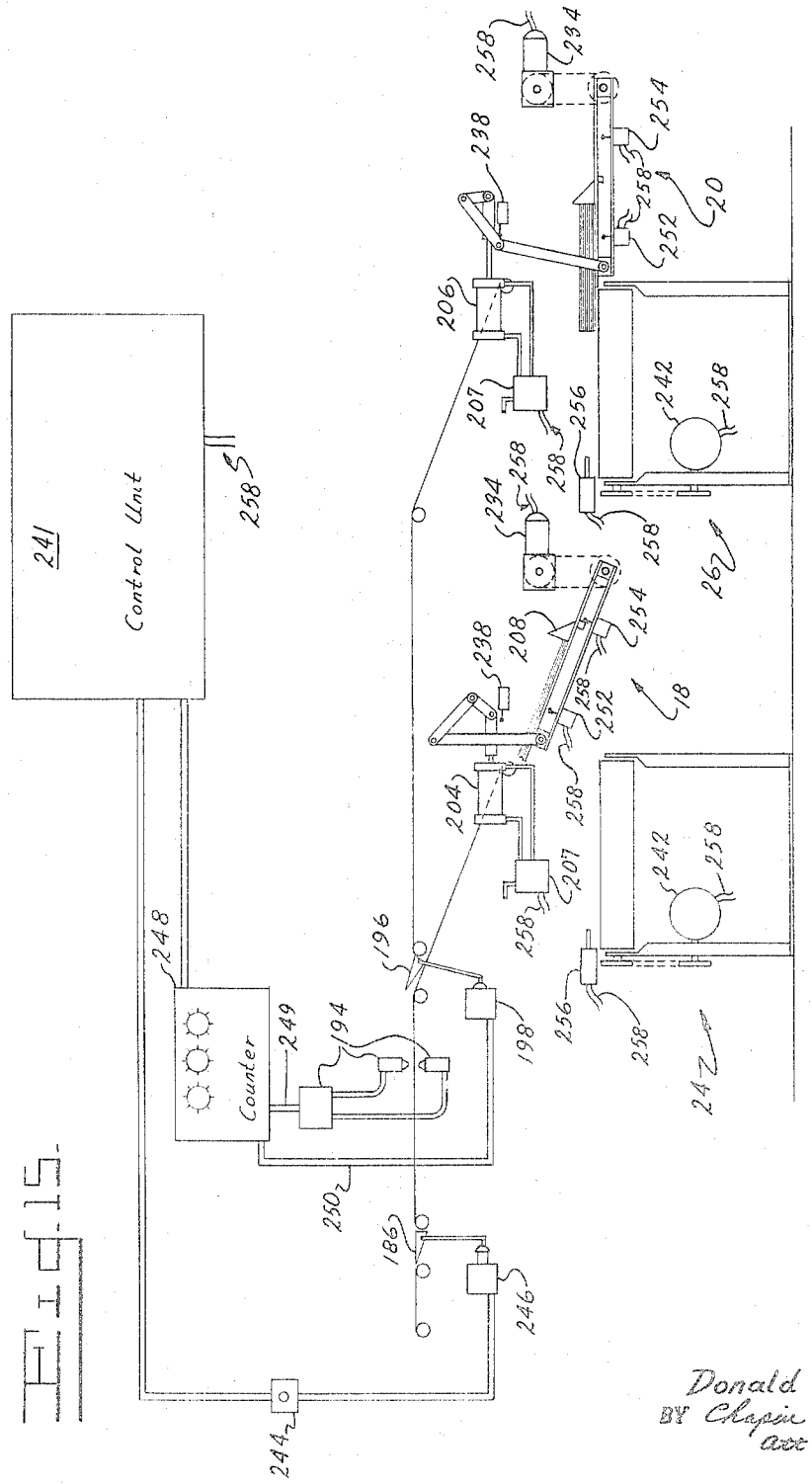

United States Patent Office 3,290,976
Patented Dec. 13, 1966

3,290,976
PAPER CUTTING MACHINE
Donald R. Grody, 6 Lee Road, Lenox, Mass.
Original application Jan. 5, 1962, Ser. No. 164,454, now Patent No. 3,182,537, dated May 11, 1965. Divided and this application Jan. 5, 1965, Ser. No. 423,490
4 Claims. (Cl. 83—302)

This invention relates to paper cutting machines and more particularly to automatic machines for producing cut size paper.

This is a divisional application of an early application, Serial No. 164,454, filed January 5, 1962, now U.S. Patent No. 3,182,537.

In the paper mill trade, sheets of paper ranging in size from 8" x 10" to 8½" x 16" are referred to as "cut size" papers, and sheets ranging in size from 17" x 22" to 22" x 34" are known as folio size. Conventionally, the method of producing cut and folio size papers comprises first cutting a web of paper into large size sheets, each of which is large enough to produce a plurality of cut size papers. The larger sheets are thereafter cut exactly into desired size sheets by guillotine type cutters. These methods for producing cut and folio size paper are not readily adaptable to automation. Moreover, the presently available types of paper cutting machines are not capable of producing sheets cut-to-size with sufficient dimensional accuracy to be acceptable as a competitive product for the sheets produced with a guillotine type cutter.

It is the principal object of this invention to provide a machine which will accurately produce cut and folio size sheets from continuously moving webs of paper.

It is another object of this invention to provide a machine of the above type which is capable of cutting a plurality of superposed webs of paper simultaneously within a degree of accuracy heretofore unattainable.

It is a further object of this invention to provide a completely automatic paper cutting machine which will not only cut the paper but also count, collect and stack the cut size sheets for packaging in reams.

The above and other objects of this invention will be more readily apparent from the following description and with reference to the accompanying drawing in which:

FIG. 1 is an overall perspective view showing a machine embodying this invention;

FIG. 2 is an elevational view in section of the paper cutting portion of the machine, with parts cut away;

FIG. 3 is an elevational view showing the opposite side of the paper cutting portion of the machine;

FIG. 4 is a section taken along line 4—4 of FIG. 3;

FIG. 5 is an elevational view showing in cross section the rotary knife cylinder used in this machine;

FIG. 6 is an elevational view showing a portion of the sheet delivery and stacking system of the machine;

FIG. 7 is an elevational view showing the construction details of the web slitting section of the machine;

FIG. 8 is a side elevational view showing the paper stacking and transfer mechanism;

FIG. 9 is a section taken along line 9—9 of FIG. 7;

FIG. 10 is a section taken along line 10—10 of FIG 9;

FIG. 11 is a section taken along line 11—11 of FIG. 1;

FIG. 12 is a section taken along line 12—12 of FIG. 11;

FIG. 13 is a modified form of rotary cutter;

FIG. 14 is a modified form of draw roll; and

FIG. 15 is a diagrammatical view showing an electrical system for controlling the operation of the machine.

Referring to the drawing, in FIG. 1 is shown a paper cutting machine embodying the invention. In general, the machine comprises a cutting section, shown generally at 10, in which a plurality of webs of paper, such as shown at 12, are severed longitudinally and transversely into sheet size papers, as shown at 14. The machine also comprises an automatic tape delivery section 11 for carrying the cut size papers to collection stations, as shown at 18 and 20. At each collection station are provided a plurality of trays 22 to receive and stack the cut size sheets into packs preferably of ream size. From these trays the reams are automatically transferred, as will be described below, to conveyors 24 and 26 on which they are carried to a suitable table 27 spanning the ends of the two conveyors.

The top of the table 27 is disposed in a plane below the upper surfaces of the conveyors to enable the reams to flow onto the table. The table 27 is provided with pairs of reciprocating dogs 28 for pushing the reams to a central position between the two conveyors. As shown in FIG. 11, the dogs 28 are mounted on leaf springs 29 so that they will be deflected downwardly, passing under a ream of paper when returning to their starting position. The dogs 28 may be driven by a chain and sprocket system as shown at 31 in FIG. 11. From the central position on the table, the reams may be transferred by any suitable means such as piston operated pusher 30 to a single conveyor on which they may be carried to a suitable wrapping machine. The entire process of handling the paper from the rolls to the wrapping machine is automatic and continuous.

The machine comprises side frames 34 and 36 between which are mounted a number of web feeding rolls and slitters, provided for severing the webs of paper longitudinally and a rotary cutter 40 for cutting the longitudinally severed webs into sheets of exact size.

As shown in FIG. 1, the webs 12, drawn from rolls of paper 44, are led under a vertically adjustable lead roll 46, which is supported by a pair of lever arms 48 (FIG. 2). Each of the arms 48 is pivotally mounted as at 50 on opposite wall portions of the support frames 34 and 36. By adjusting the arms 48, the webs may be tensioned for proper tracking through the machine, the rolls 44 being braked in any suitable manner to provide the desired web tension.

After the lead roll 46, the web passes over a roll 52. Forwardly of the roll 52, in the direction of web travel, is provided means for slitting the webs longitudinally to desired sheet width. As shown, the slitting means comprises a bottom slitter 54 and a top slitter 56 (see also FIG. 7).

The bottom slitter includes a plurality of circular discs 58 mounted in axially spaced relation along a shaft 60 supported by bearings on the frames 34 and 36. The shaft 60 is driven by a pulley 61 and belt 62 from pulley 63 (FIG. 2). A plurality of sleeves 64 insure proper disc spacing. The discs and spacers 64 are all held in place on the shaft 60 by nuts 66.

The top slitter comprises a corresponding number of axially spaced circular cutting blades 68. The top slitter blades are mounted on a sleeve 70 (FIG. 7) supported on an eccentric shaft 72. A handle 74 extends radially outwardly of the eccentric shaft and provides means for raising and lowering the top slitters into and out of their cutting positions. A cam, shown generally at 76, is also provided so that when the top slitters are lowered by rotation of the handle 74 the sleeve on which the blades are mounted is shifted axially, compressing a coil spring 78. In this way the top slitter blades are moved axially to bear against the lower slitter discs. This arrangement facilitates threading the webs of paper into the machine. The lower slitters are driven at a speed slightly greater than the speed at which the web is advanced through the machine by means of a draw roll 80. Springs 82 (FIG. 7) resiliently hold the blades 68 in contact with the lower discs 58 so that rotation of the lower shaft causes rotation of the upper blades.

The draw roll 80 is disposed forwardly of the slitters and is driven by a belt 82 (FIG. 2) from pulley 84. The pulley is keyed to a shaft 85 disposed transversely of the machine and driven by a large pulley 87, by belt drive 89 from the motor 91. A pinch roll 86 is mounted above the draw roll and supported by a pair of arms 88 (FIG. 2) pivotably mounted as at 90 to opposite portions of the side plates 34 and 36. Predetermined pressure is maintained on the webs of paper by the pinch roll by means of air cylinders 92, the pivotable arms being controlled by connecting rods 94 which extend to pistons (not shown) within the air cylinders 92. As shown, the pinch roll has a rubber surface with helical grooves which tend to spread and hold the webs of paper flat against the opposed surface of the draw roll.

As shown in FIG. 3, the rotary cutter 40, mounted on a shaft 96, is driven by direct gearing to the draw roll shaft 98 which is provided with a large gear 100 meshed directly with a gear 102 on the rotary cutter shaft 96. This direct gear drive arrangement minimizes errors or variations in sheet length by utilizing a highly accurate transmission system. By this direct drive system backlash is reduced to a minimum resulting in maximum effectiveness of sheet length control. In addition, the direct drive provides a highly efficient arrangement for obtaining sheet size accuracy without the necessity of making critical adjustments of variable speed drive devices.

A pair of nip rolls 104 and 106 are disposed intermediate the draw roll 80 and knife cylinder 40. The lower nip roll extends across the machine from side frame to side frame as does the upper nip roll 106, the latter of which may comprise a plurality of axially spaced rolls. Both the upper and lower nip rolls are driven; the lower roll being driven by a belt and pulley 108 and 110, respectively. A gear 112 (FIG. 3) is provided on the shaft 113 of the lower nip roll and is engaged with a gear on the shaft of the upper nip roll. The nip rolls are driven at a speed which is slightly faster than the speed of the web so as to hold the web taut and in a flat plane intermediate the draw roll and rotary knife cylinder 40. Moreover, the nip rolls act to push the webs under the knife cylinder where they are severed transversely.

The knife cylinder 40 is journaled in a pair of spaced brackets 114 bolted onto the outer ends of a cross bar 116. The bar 116 extends across the width of the machine and carries a bed knife or fixed blade 118 (FIGS. 4 and 5). A rotating blade 120 extends from the periphery of the knife cylinder as in the form of a helix so that it cuts the web progressively from edge-to-edge thereof. The entire knife assembly, including the fixed and rotating knife blades, is mounted at an oblique angle or bias between the side plates in order to compensate for the bias cut made by the helical blade.

The entire cutting section is mounted on a pair of support members 122 (FIG. 4) bolted to the side plates of the machine by bolts 124. The entire cutting section is movable toward and away from the draw roll by movement of a handle 126. The handle 126 provides means for rotating an eccentric shaft 128 which extends through openings 129 in the supports 122. Rotation of the shaft 128 with bolts 124 loosened causes both support members 122 to be shifted toward or away from the roll. After proper adjustment of the cutting section, the bolts 124 are tightened. The adjusability of the knife cylinder enables the gears 100 and 102 to be replaced by other gears having different numbers of teeth for cutting sheets of different length.

The entire cutting section is also adjustable at each end in order to compensate for the bias cut of the helical blade. This adjustment may be carried out by rotation of adjusting screws 130 (FIG. 4) supported by brackets 132 at each end of the knife cylinder. The end of the screw 130 is threaded into a block 134 bolted to opposite ends of the bar 116 by bolts 136. At each end, the bar 116 is held securely in place on the supports 122 by a screw 138 (one shown) in FIG. 4. By loosening the screw 138 at one end of the bar 116 and rotating the adjusting screw 130 at the opposite end of the bar 116, the cutting section is skewed or pivoted in a horizontal plane about the other hold-down screw 138.

The rotary cylinder 40 is also adjustable vertically by means of adjusting screws 140 disposed at each end of the knife cylinder. The screws 140 extend from the blocks 134 into the cylinder supporting brackets 114. Using these screws, each end of the knife may be adjusted vertically relative to the bed knife.

The blade 120 may also be adjusted by means of a series of bolts 142 disposed in spaced relation across the cylinder, see FIG. 5. Using the bolts 142, the knife may be precisely adjusted over its entire length for proper cutting engagement with the bed knife.

The rotary knife is designed to cut the web of paper to a sheet length which is a function of the length of web advanced by the draw roll during one revolution of the knife cylinder. Thus, the sheet length cut by the machine depends upon the relationship of the speed of rotation of the knife cylinder and the speed and radius of the draw roll. For a draw roll of given radius, therefore, the sheet size depends upon the ratio of the angular velocities of the knife cylinder to the draw roll. In order to provide accurately sized sheet, this ratio must be very closely controlled. By directly driving the knife cylinder from the draw roll, it has been found that sheets accurately sized to a tolerance of better than .010″ are obtained. Using the above described machine, sheet size can be readily changed by simply changing gears 100 and 102 for other gears of different gear ratio.

When a plurality of superimposed webs are cut simultaneously by a conventional type rotary cutter, differences in length are evident. The reason for this length variation is that the superimposed webs are advanced over different radii from the inner to outer sheet caused by the thickness of the web. This uneven cut is known as "creep" and depends on the thickness and number of webs being cut. It has been found that by making the diameter of the draw roll substantially larger than the length of sheets to be cut, and preferably 1½ times the sheet length, for all practical purposes creep is eliminated, making it feasible to simultaneously cut a plurality of webs with a uniformity acceptable in the trade.

The cut size sheets 14 are carried away from the knife cylinder by the tape conveyor system 11 and delivered to selectively the first and second stacking stations 18 or 20, FIG. 1. The tape conveyor systems comprise a plurality of endless tapes or bands such as shown at 144 in FIG. 1 disposed in spaced relation across the width of the machine. The tapes extend around rollers extending across the machine and are driven in the same direction by belt and puley systems, such as shown generally at 146, 148 and 150, in FIG. 1.

Shaft 152, FIG. 3, is driven by a belt 154 and the pulley 87. On the opposite end of the shaft 152, FIG. 2, is provided a double pulley 155. One of the pulleys drives a belt 158. The other pulley drives belt 108 and pulley 110 on the lower nip roll shaft. An adjustable idler pulley 160 is provided for varying the tension of the belt 108. Shafts 152 and 162 are provided with meshed gears 164, 166 by which an upper tape system 168 is driven (FIGS. 1 and 6).

The upper tape system 168 extends generally the entire length of the machine, and together with a plurality of lower tape systems 170, 172, 174, 176, 178, 180 and 182 (FIGS. 1 and 6), carries the cut size sheets to either the first or second stacking station . . . or if the sheets are imperfect, to a reject station by tape system 184.

In FIG. 6 is shown the various tape systems from the rotary cutter to the first stacking station. Since the tape systems which convey the sheets to the second stacking station are identical, only the systems utilized for conveying sheets to the first stacking station will be described in detail.

In general, the tapes are driven at a higher speed than the speed of rotation of the rotary knife cylinder. In this way, the cut size sheets are rapidly carried away from the knife as soon as they have been severed from the web.

As shown in FIG. 6, the sheets are carried between the lower span of the upper tape system 168 and the upper span of a lower tape system 170. The sheets are carried to a pivotable reject gate 186 which comprises a plurality of wedge-shaped members (one shown) disposed between the tapes. The gates, mounted on a cross rod which extends transversely of the machine, are flipped up or down by rotation of the rod which may be accomplished manually or automatically by an electronic signal from an inspection device for scanning the sheets carried by the tapes. When the gate 186 is raised or pivoted upwardly, sheet flow is deflected downwardly along the inclined portion of the tape system 170. Another tape system 184 is provided for deflecting the rejected sheets into a collection box.

A nip roll 188 is disposed forwardly and nip roll 190 rearwardly of the reject gate 186. The nip rolls are supported by arms 192 pivotably mounted on the side plates 34 and 36. The nip rolls serves to depress the lower span of tapes so that they are held in firm contact with the sheet. The rolls 188 and 190 are preferably spaced apart a distance $a$ less than the length of the sheets being handled by the machine so that one or the other of the rolls is always in control of the sheet. Thus, the sheets are pushed or pulled along a horizontal path so that if the gate is raised, it will not disrupt the flow of the sheets passing over the gates when they are operated, but will deflect the next row of sheets downwardly into the reject tape system.

Assuming the reject gate is down, the sheets are carried beween the upper tape system 168 and the lower tape system 172 in the path of an electronic or other suitable counting device 194. The counting device acts to control the operation of a selector gate 196 which may be of the same general construction as the reject gate heretofore described. Control of the selector gate may be accomplished by means of a solenoid 198 operated by the counting device when a predetermined number of sheets has passed the counter, such for example, as 500 for ream packs. When the predetermined count has been reached, flow of the sheets will be diverted by the gate 196 from one to the other collection stations, depending upon which has just been filled. The counter 194 is preferably positioned at a distance from the gate 196 less than the length of a sheet. Position of the counter with respect to the gate insures that the gate will operate while a sheet is directly over it or under it thereby eliminating the possibility of the forward edge of the next sheet coming in contact with the leading edges of the gate while the gate is in motion. If this did happen it might cause a jam up. Pinch rolls 188' and 190' are disposed before and after the gate and serve the same purpose as rolls 188 and 190 heretofore described.

Referring to FIGS. 1 and 6, and assuming that the sheets being conveyed to the second collection station 20 when the counter 194 has detected the passage of 500 sheets, the gate 196 will be flipped upwardly. Sheet flow thus diverted to the first collection station 18.

Means is provided for "shingling" or overlapping the sheets as they are delivered to the stacking trays. As shown, this is accomplished by upper 176 and lower tape system 178. The lower tape system 178 is driven at a slower speed than the upper tape system by the belt and pulley arrangement, such as shown in 150 in FIG. 1, which drives the similarly operating tape system 180. A nip roll 200 extends transversely of the sheet flow urging the lower span of the upper tapes 176 downwardly. Thus, as the sheets flow toward the trays, they are deflected downwardly on to the reduced speed tapes in such a way that the after end of each sheet drops below the leading edge of the succeeding sheet, still moving at high speed. The result of this arrangement is that the sheets are shingled as they are delivered into the collection trays 22 disposed in side-by-side relation across the width of the machine and with the floor of the trays disposed in coplanar relation with the tape systems 176 and 178. The sheet flow continues until the trays at the first collection station are filled. The counter 194 causes a change in the position of the gate 196 so as to divert the flow of the sheets to the second collection station 20.

The trays are mounted for pivotable movement about an axle or shaft 202 which extends between the upright supporting frames of the machine. The axle 202 is journaled at its outer ends in blocks 203, FIG. 9, supported by means of leaf springs 205. The spring mounting arrangement enables the trays to be vibrated primarily in a direction at right angles to the sheet flow.

Cylinders 204 and 206, which may be air or hydraulic operated, are provided for moving the collection trays from their inclined position to a horizontal position for unloading the reams of paper onto the conveyors 24 and 26. The cylinders may be solenoid controlled, as shown at 207 in FIG. 15, the solenoid being electrically connected to an electrical control unit 241 which derives a signal from the counter 194. When the trays are in their sheet receiving positions, as shown in FIG. 6, they are disposed at a substantial angle above the horizontal enabling the sheets to be neatly gravity stacked with their edges in registered relation. For cut size sheets the angle of inclination of the trays is preferably about 30° and for folio size 20°.

Means is provided for oscillating or vibrating the trays to "joggle" the sheets sufficiently to insure that their leading edges will come into engagement with back stops or plates 208 of each tray. Upright plates 209 act to guide the sheets into engagement with the plates 208. As shown, the trays are vibrated by means of a motor or vibrator 210 (FIG. 8), such as marketed by Syntron, mounted on the frame of the tray. If a motor is used, the shaft is eccentrically weighted so as to vibrate the frames. Since the axle 202 is spring mounted to the frames, oscillation of the trays occurs principally in a direction transverse to the direction of sheet flow.

The trays 20 are affixed to a tubular rod 212 through which the axle 202 extends. The rod 212 is fitted at its opposite ends with sleeves 214 which rotate with the tubular members 212 about the axle 202. As shown in FIG. 10, bearings 216 are provided intermediate the sleeves 214 and the shaft 202. Operation of the cylinders 204 or 206 causes rotation of the tubular rods 212 and the sleeves 214 about the axle 202.

When the trays are in their horizontal position as shown in FIG. 8, means is provided for moving the back stops 208 to discharge the reams of paper from the trays onto the conveyors. As shown, each of the back plates is connected by means of a clamp 220 to a cross rod 222. At each end the cross rod is connected by a link 224 to chains 226 and 227, driven by sprockets 228 and 230 disposed at opposite ends of the trays. As shown in FIG. 9, sprocket 230 is a double sprocket driven by a chain 232 by motor 234. The sprockets 228 and 230 are keyed to the shaft or axle 202 so that the motor 234 drives both chains 226 and 227 to move all the back plates 208 simultaneously. The bottoms of the trays are provided with slots 236 to permit the plates to move sufficiently forward for the trays to eject the reams onto the conveyors 24 and 26.

The motor 234 may be controlled by a signal from limit switches 238 (FIG. 15) disposed to be actuated when the trays are lowered to their horizontal position. The limit switch may be electrically connected to the electrical control unit 241 from which the motors 234 and conveyor motors shown at 242 (FIG. 15) receive control signals by leads 258. When the limit switch 238 is actuated, the motor 242 is stopped and the motor 234 drives so as to transfer the reams or stacks of paper onto the conveyors. After the reams are transferred to the conveyors the trays are returned to their sheet receiving positions. Upward movement of the trays releases the limit switch 238 whereby the motor 242 commences to drive the conveyors.

The operation of motor 234 may be controlled in any convenient manner whereby the motor will drive in one direction to move the back plates 208 forwardly to eject the reams from the trays. Thereafter, the motor is reversed to return the back plates to their starting positions. This control may be accomplished by predetermined time sequence or as shown in FIG. 15 by limit switches 252 and 254. Motor 234 drives to eject the reams from the trays until limit switch 252 is actuated. This sends a signal via the control unit 241 to the motor 234 causing the motor to reverse direction and solenoid 207 to raise the trays. The back plates continue rearwardly until limit switches 254 is actuated.

As shown, the conveyors 24 and 26 are driven by means of electrical motors 242. The conveyors may be any suitable construction such as slat type for carrying the reams of paper to the transfer table 27. As described above, the transfer table operates to receive the reams of paper from the two conveyors by means of the dogs 28 and shifts the reams to a central location on the table. From this position, they are transferred to the conveyor 32 by means of a pusher 30 which may be operated in any suitable manner. The conveyors alternately convey the reams of sheets at right angles to the sheet flow in the cutting and tape delivery systems.

Referring to FIG. 15, the control sequence may be summarized as follows. The reject gate 186 is operated when it is desirable to reject a defective run of sheets, such as occurs at the beginning or end of a roll of paper. The gate 186 may be operated by a selector switch 244 which actuates a solenoid 246. Preferably, the switch 244 is located on the operator's side of the machine.

Assuming that the reject gate is down and the sheet flow is passing under the operating gate 196 to stacking station 18, the counter pickup 194, which may be a photoelectric eye or a high frequency sound pickup such as a "Sonac" marketed by Aro Co., sends a pulse signal on line 249 to an electronic counter 248, such as marketed by the Post Electronic Co. The counter may be preset to any desired number. After the counter has reached its preset count, it transmits a signal, such as a continuous pulse, to operate a relay which in turn opens the circuit 250 to the gate operating solenoid 198. This results in gate 196 being moved downwardly diverting the flow of sheets from the first stacking station 18 to the second stacking station 20, which in the meantime has returned to its sheet receiving position after its previous discharge operation, shown in FIG. 15. The relay actuated by the counter also closes a circuit to a time delay relay in the control unit 241. The time delay relay actuates solenoid valve 207 which operates on cylinder 204 to lower the trays after sufficient time has elapsed to allow all sheets to flow from the counter to the stacking trays. This starts the discharge cycle by which the reams are transferred from the trays to the conveyor 24.

When the trays have been lowered to a horizontal position, the limit switch 238 is actuated, such as by the linkage which moves the trays, causing the conveyor motor to stop and the pusher motor 234 which drives the back plates 208 to transfer the reams onto the conveyor 24.

When the plate has reached the forward limit, it actuates a limit switch 252 causing pusher motor 234 to reverse direction and the stacking trays to return to their upwardly inclined position. The back plates 208 continue rearwardly actuating a limit switch 254 to cut off motor 234. As soon as the trays start upwardly, the limit switch 238 is released and the conveyor motor 242 starts to drive. The conveyor carries the reams to the end of the conveyor and onto the table 27 where the leading ream operates limit switch 256 to stop the conveyor motor 242 until the leading ream is moved out of the path of the next ream. The limit switches 256 are located so that when one ream is moved by the transfer table dogs, the conveyor motor operates to transfer the next ream onto the table. The motor 242 drives the conveyor until the next succeeding ream operates limit switch 256.

All the limit switches, tray and conveyor motors and tray operating solenoids are wired into the control unit, as shown by leads 258. The correct sequencing of the electrocal control equipment causes operation of a reset relay in the control unit 241 which insures that the unloading cycle of the same stacking station does not repeat itself.

In FIG. 13 is shown a modified form of cutter 260 which comprises a pair of oppositely rotating knife cylinders 262 and 264. Each cylinder is provided with a cutter blade 266 in the form of a spiral, as described above.

At 270 in FIG. 14 is a modified form of draw roll. The outer surface of the draw roll is grooved or corrugated, as at 272, to minimize creep where a plurality of webs of paper 12 are cut simultaneously. As described above, creep is caused by the webs being fed around different radii because of their thickness. The grooves extend generally parallel to the roll axis and compensate for the radial difference of web movement because the inner webs tend to follow the corrugated surface of the roll to a greater degree than the outer webs. A pinch roll is shown at 278 for holding the webs 12 in contact with the draw roll.

Having thus described this invention, what is claimed is:

1. Machine for producing folio and cut size paper comprising a draw roll mounted on a shaft for feeding at least one web of paper along a predetermined path, means for continuously severing said web longitudinally, a cutter assembly including a stationary bed knife disposed at a predetermined distance from said draw roll, and a rotary knife mounted on a second shaft parallel to the first shaft and disposed to cut the severed web transversely into sheets of predetermined size, a gear carried by the shaft said draw roll, a second gear affixed to said second shaft, said first and second gears being in direct mesh, means supporting said cutter assembly and movable toward and away from the draw roll shaft, and means for selectively shifting said cutter assembly supporting means toward and away from the draw roll shaft, thus permitting change in the gear ratio of said gears for cutting different lengths of paper.

2. Machine as set forth in claim 1 in which said cutter assembly is supported at each end by a support bracket, and means for simultaneously moving said support brackets toward and away from the shaft of the draw roll with the shaft of the rotary cutter in parallel relation thereto.

3. Machine as set forth in claim 1 in which the draw roll has a diameter at least equal to the length of said sheets.

4. Machine as set forth in claim 1 in which the draw roll has a diameter of 1.5 times the width of said sheets.

(References on following page)

References Cited by the Examiner

UNITED STATES PATENTS

| | | | |
|---|---|---|---|
| Re. 19,989 | 5/1936 | Swift | 83—311 |
| 630,631 | 8/1899 | Ronsay et al. | 83—302 |
| 886,454 | 5/1908 | Wood | 226—190 |
| 1,118,843 | 11/1914 | Collis et al. | 83—302 X |
| 1,666,984 | 4/1928 | Willsea | 83—89 |
| 1,718,145 | 6/1929 | Hartman | 83—343 X |
| 1,759,676 | 5/1930 | White | 83—498 |
| 1,797,950 | 3/1931 | Forman | 83—408 |
| 1,976,156 | 10/1934 | Beidler | 83—436 |
| 2,218,232 | 10/1940 | Ellis | 83—436 |
| 2,233,922 | 3/1941 | Kaddeland | 83—339 |
| 2,497,155 | 2/1950 | Davis | 83—408 |
| 2,624,407 | 1/1953 | Chalmers | 83—498 |
| 2,883,191 | 4/1959 | Peugnet | 271—89 |
| 3,018,935 | 1/1962 | Maddock | 226—190 |

FOREIGN PATENTS

| | | |
|---|---|---|
| 718,136 | 10/1931 | France. |

WILLIAM W. DYER, JR., *Primary Examiner.*

ANDREW R. JUHASZ, *Examiner.*

J. L. SEITCHIK, L. B. TAYLOR, *Assistant Examiners.*